US012271218B2

(12) United States Patent
Kamijima

(10) Patent No.: US 12,271,218 B2

(45) Date of Patent: Apr. 8, 2025

(54) REFERENCE CURRENT CIRCUIT

(71) Applicant: ABLIC Inc., Nagano (JP)

(72) Inventor: Yasuhiro Kamijima, Nagano (JP)

(73) Assignee: ABLIC INC., Tokyo (JP)

( * ) Notice: Subject to any disclaimer, the term of this patent is extended or adjusted under 35 U.S.C. 154(b) by 26 days.

(21) Appl. No.: 18/506,254

(22) Filed: Nov. 10, 2023

(65) Prior Publication Data

US 2024/0248505 A1 Jul. 25, 2024

(30) Foreign Application Priority Data

Jan. 24, 2023 (JP) ................................ 2023-008507

(51) Int. Cl.

*G05F 3/26* (2006.01)

*G05F 3/24* (2006.01)

(52) U.S. Cl.

CPC .............. *G05F 3/262* (2013.01); *G05F 3/242* (2013.01)

(58) Field of Classification Search

None

See application file for complete search history.

(56) References Cited

U.S. PATENT DOCUMENTS 4,399,374 A * 8/1983 Boeke ..................... G05F 3/262 327/594

6,876,251 B2 * 4/2005 Watanabe ............... G05F 3/245 327/541

7,479,821 B2 * 1/2009 Imura ................. H01L 27/0883 327/543

8,542,060 B2 * 9/2013 Tomioka ................. G05F 3/245 327/539

2001/0020844 A1 9/2001 Andoh et al.

FOREIGN PATENT DOCUMENTS

JP 2001-284464 A 10/2001

JP 2007206972 A * 8/2007

* cited by examiner

*Primary Examiner* — Thomas J. Hiltunen

(74) *Attorney, Agent, or Firm* — Chrisman Gallo Tochtrop LLC

(57) ABSTRACT

A reference current circuit includes: a current mirror circuit for supplying Iout based on Iin; an E-mode MOS including a drain that supplies Iout, a gate connected to the drain, and a grounded source; a first D-mode MOS including a gate terminal connected to the gate terminal of the E-mode MOS, and generating Vref; a voltage dividing circuit for supplying a divided voltage (Vdiv) of Vref; and a second D-mode MOS for supplying Iin based on Vdiv. The E-mode MOS is the same as the first D-mode MOS in conductivity type and impurity concentration of a channel, and is different from the first D-mode MOS in Fermi level of a gate electrode. The voltage dividing circuit supplies Vdiv higher than a threshold voltage of the second D-mode MOS and lower than a cross point (X) to a gate terminal of the second D-mode MOS.

4 Claims, 9 Drawing Sheets

REFERENCE CURRENT CIRCUIT

BACKGROUND OF THE INVENTION

1. Field of the Invention

The present invention relates to a reference current circuit.

2. Description of the Related Art

Mobile devices, wearable devices, and the like are used in various locations and under varying weather conditions, and are accordingly demanded to operate stably regardless of changes in usage environment. Downsizing of those devices is being advanced, and parts installed in those devices, such as semiconductor chips, are demanded to be downsized as well.

Most of the semiconductor chips installed in such devices include an analog circuit, and a reference current from a reference current source is supplied as a bias current to the analog circuit.

Some reference current circuits supply the reference current through conversion of a reference voltage generated by a reference voltage circuit into a current with use of a highly precise resistive element. For the purpose of steadily supplying the reference current, various proposals have been made with respect to this type of reference current circuits.

For example, many proposals have been made with respect to reference voltage circuits capable of suppressing fluctuations in reference voltage in response to changes in ambient temperature.

An example thereof is a reference voltage circuit that enables a decrease in manufacturing variation by giving elements that are affected by changes in ambient temperature a structure common to each other. Specifically, there has been proposed a reference voltage circuit that cancels out effects of a change in conductivity coefficient in a channel by including paired transistors which include gates having different Fermi levels and channels having the same conductivity type and the same impurity concentration (see Japanese Patent Application Laid-open No. 2001-284464).

SUMMARY OF THE INVENTION

An object of at least one aspect of the present invention is to provide a reference current circuit that is capable of supplying, with high precision, a reference current stable regardless of changes in ambient temperature, and that enables a reduction in layout area as well.

According to at least one embodiment of the present invention, there is provided a reference current circuit including: a current mirror circuit formed from a MOS transistor pair which is a pair of MOS transistors having gate terminals connected to each other, the current mirror circuit being configured to supply an output current based on an input current that is received by one of the MOS transistors from another of the MOS transistors; an output MOS transistor configured to supply a reference current based on a voltage of the gate terminals of the MOS transistor pair; an enhancement mode MOS transistor including a drain terminal to which the output current is to be supplied from the current mirror circuit, a gate terminal connected to the drain terminal, and a source terminal that is grounded; a first depletion mode MOS transistor including a gate terminal connected to the gate terminal of the enhancement mode MOS transistor, the first depletion mode MOS transistor being configured to generate a reference voltage based on a difference between a voltage of the source terminal of the enhancement mode MOS transistor and a voltage of a source terminal of the first depletion mode MOS transistor; a voltage dividing circuit connected to the source terminal of the first depletion mode MOS transistor, the voltage dividing circuit being configured to supply a divided voltage of the reference voltage; and a second depletion mode MOS transistor configured to supply, as the input current, a current based on the divided voltage to the current mirror circuit, the enhancement mode MOS transistor being the same as the first depletion mode MOS transistor in conductivity type and impurity concentration of a channel, and being different from the first depletion mode MOS transistor in Fermi level of a gate electrode, the voltage dividing circuit being configured to supply a gate terminal of the second depletion mode MOS transistor with the divided voltage within a voltage range higher than a threshold voltage of the second depletion mode MOS transistor and lower than a cross point at which gate voltage-drain current characteristics of the second depletion mode MOS transistor are independent of temperature.

According to the at least one aspect of the present invention, it is possible to provide the reference current circuit that is capable of supplying, with high precision, the reference current stable regardless of changes in ambient temperature, and that enables a reduction in layout area as well.

DESCRIPTION OF THE EMBODIMENTS

Figure 1:
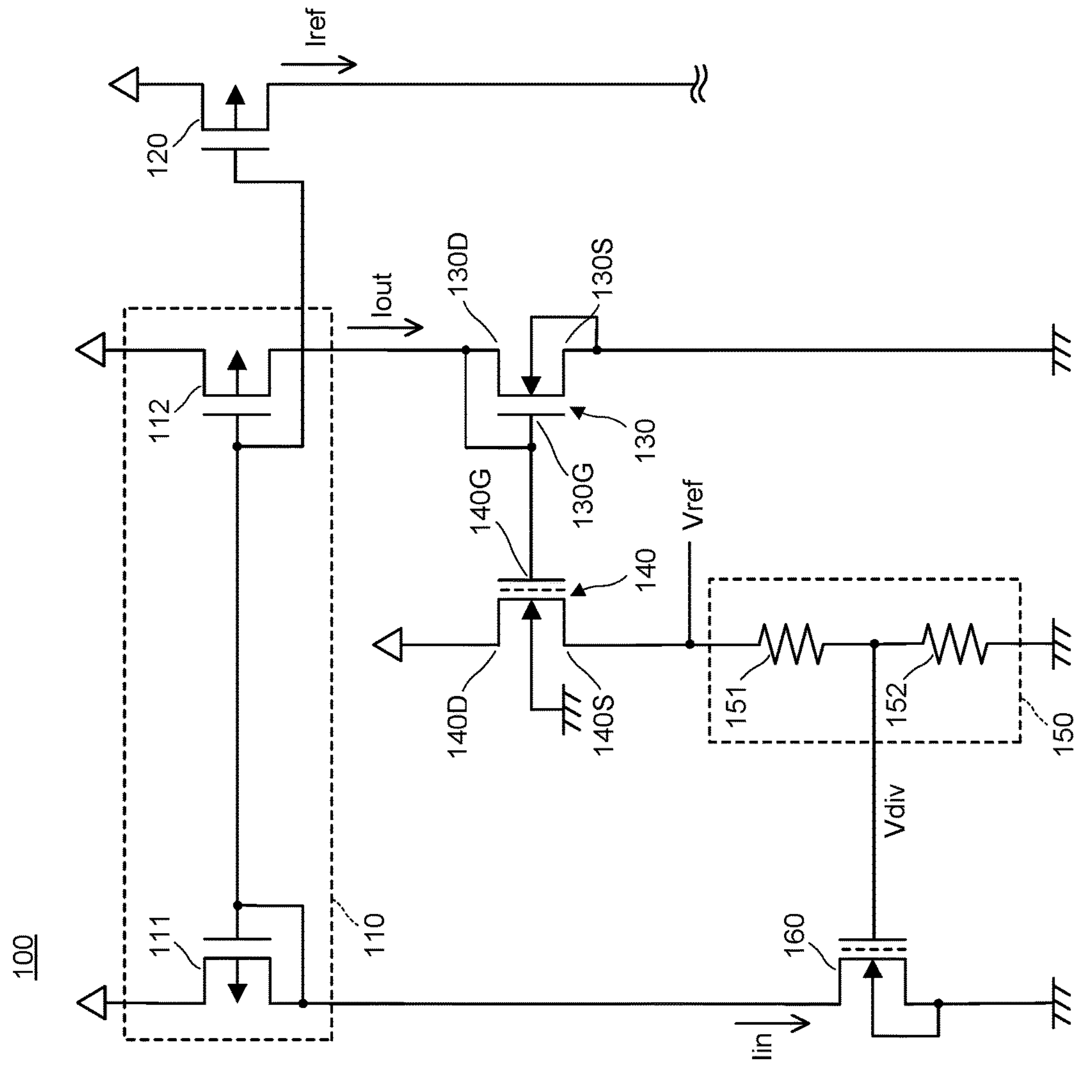
FIG. 1 is a circuit diagram for illustrating a reference current circuit according to at least one embodiment of the present invention.

In the following, at least one mode for carrying out the present invention is described in detail with reference to the drawings.

The same components are denoted by the same reference symbols in the drawings, and overlapping description thereof is omitted in some cases.

Moreover, an X-axis, a Y-axis, and a Z-axis shown in the drawings are orthogonal to one another. In some cases, an X-axis direction is referred to as "width direction," a Y-axis direction is referred to as "depth direction," and a Z-axis direction is referred to as "height direction" or "thickness direction." In addition, in some cases, a surface on a +Z-direction side of each film is referred to as "front surface" or "upper surface," and a surface on a −Z-direction side of each film is referred to as "back surface" or "lower surface."

Moreover, the drawings are merely schematic, and, for example, a ratio among width, depth, and thickness is not necessarily drawn to scale. The numbers, positions, shapes, structures, dimensions, and the like of a plurality of films or layers or semiconductor elements obtained by combining those films or layers in their structures are not limited to those described in the following at least one embodiment, and can be set to numbers, positions, shapes, structures, dimensions, and the like that are preferred in carrying out the present invention.

FIG. 1 is a circuit diagram for illustrating a reference current circuit according to the at least one embodiment.

As illustrated in FIG. 1, a reference current circuit 100 includes a current mirror circuit 110, an output MOS transistor 120, an enhancement mode MOS transistor 130, depletion mode MOS transistors 140 and 160, and a voltage dividing circuit 150.

The current mirror circuit 110 supplies an output current Iout, based on an input current Iin supplied from the depletion mode MOS transistor 160. The current mirror circuit 110 is formed from MOS transistors 111 and 112 which are a MOS transistor pair having gate terminals connected to each other.

The MOS transistor 111 is a P-channel MOS transistor with the gate terminal connected to a drain terminal, and includes a source terminal connected to a power supply terminal. The MOS transistor 111 is connected to the depletion mode MOS transistor 160 at the drain terminal, and the input current Iin supplied by the depletion mode MOS transistor 160 flows between the source and the drain thereof.

The MOS transistor 112 is a P-channel MOS transistor with the gate terminal connected to the gate terminal of the MOS transistor 111, and includes a source terminal connected to the power supply terminal. The MOS transistor 112 supplies, from a drain terminal, the output current Iout to the enhancement mode MOS transistor 130.

The gate terminal of the MOS transistor 112 is also connected to a gate terminal of the output MOS transistor 120.

The output MOS transistor 120 is a P-channel MOS transistor, and includes a source terminal connected to the power supply terminal. The gate terminal of the output MOS transistor 120 is connected to the gate terminal of the MOS transistor 112, and the output MOS transistor 120 accordingly supplies a reference current Iref based on a voltage of the gate terminal of the MOS transistor 112.

The MOS transistors 111 and 112 and the output MOS transistor 120 are formed by the same process. Accordingly, the output current Iout has the same current value as a current value of the input current Iin because of the current mirror circuit 110, and the reference current Iref has the same current value as a current value of the output current Iout.

The enhancement mode MOS transistor 130 is an N-channel MOS transistor with a gate terminal 130G connected to a drain terminal 130D to which the output current Iout is to be supplied from the current mirror circuit 110. The gate terminal 130G of the enhancement mode MOS transistor 130 is also connected to a gate terminal 140G of the depletion mode MOS transistor 140. A source terminal 130S of the enhancement mode MOS transistor 130 is grounded.

A back gate of the enhancement mode MOS transistor 130 is connected to the source terminal 130S to be grounded.

The depletion mode MOS transistor 140 serving as a first depletion mode MOS transistor is an N-channel MOS transistor. The depletion mode MOS transistor 140 is connected at the gate terminal to the gate terminal of the enhancement mode MOS transistor 130, and includes a source terminal 140S connected to the voltage dividing circuit 150.

Being connected by wires in the manner described above as paired transistors, the enhancement mode MOS transistor 130 and the depletion mode MOS transistor 140 are capable of generating a reference voltage Vref at the source terminal 140S of the depletion mode MOS transistor 140. The reference voltage Vref is brought close to a value of an expression "$Vref=Vtne+|Vtnd|$" by approximately matching a current flowing in the depletion mode MOS transistor 140 to a current flowing in the enhancement mode MOS transistor 130. In the expression, Vtne represents a threshold voltage of the enhancement mode MOS transistor 130, and Vtnd represents a threshold voltage of the depletion mode MOS transistor 140.

The paired transistors are used as a reference voltage source, and operation, a structure, and temperature characteristics thereof are described later.

The depletion mode MOS transistor 140 is connected at a drain terminal 140D to the power supply terminal, and is connected at the source terminal 140S to the voltage dividing circuit 150. The depletion mode MOS transistor 140 is accordingly a source follower and functions as a buffer, thus eliminating a need for a buffer built from a differential amplifier which requires a large layout area. The layout area can be reduced as a result.

In the at least one embodiment, the drain terminal 140D is connected directly to the power supply terminal. The present invention, however, is not limited thereto. For example, a switching element, an ESD protection resistor, or the like may be connected in series to the drain terminal 140D.

The voltage dividing circuit 150 is a combination of resistors 151 and 152 connected in series, and a predetermined voltage division ratio determined by a ratio of resistance values of the resistors 151 and 152 is set to the voltage dividing circuit 150. Application of the reference voltage Vref from the source terminal 140S of the depletion mode MOS transistor 140 causes the voltage dividing circuit 150 to output a divided voltage Vdiv which is a fraction of the reference voltage Vref to a gate terminal of the depletion mode MOS transistor 160.

The voltage dividing circuit 150 may include a trimming circuit using a fuse or the like so as to be capable of fine adjustment of the voltage division ratio.

The depletion mode MOS transistor 160 serving as a second depletion mode MOS transistor is an N-channel MOS transistor. The depletion mode MOS transistor 160 includes a drain terminal connected to the MOS transistor 111 of the current mirror circuit 110, and includes a source terminal that is grounded.

A back gate of the depletion mode MOS transistor 160 is connected to the source terminal to be grounded.

The depletion mode MOS transistor 160 functions as a constant current source which supplies to the current mirror circuit 110, as the input current Iin, a current based on the divided voltage Vdiv applied from the voltage dividing circuit 150 to the gate terminal of the depletion mode MOS transistor 160.

The voltage dividing circuit 150 applies the divided voltage Vdiv within a predetermined voltage range to the gate terminal of the depletion mode MOS transistor 160, with temperature characteristics of the depletion mode MOS transistor 160 taken into consideration, to thereby enable the reference current circuit 100 to supply, with high precision, the reference current Iref stable regardless of changes in ambient temperature. Adjustment of the temperature characteristics of the reference current Iref is described later.

—Operation and Structure of Reference Voltage Source—

The reference voltage source built from the paired transistors that are the enhancement mode MOS transistor 130 and the depletion mode MOS transistor 140 is described next.

Figure 2:
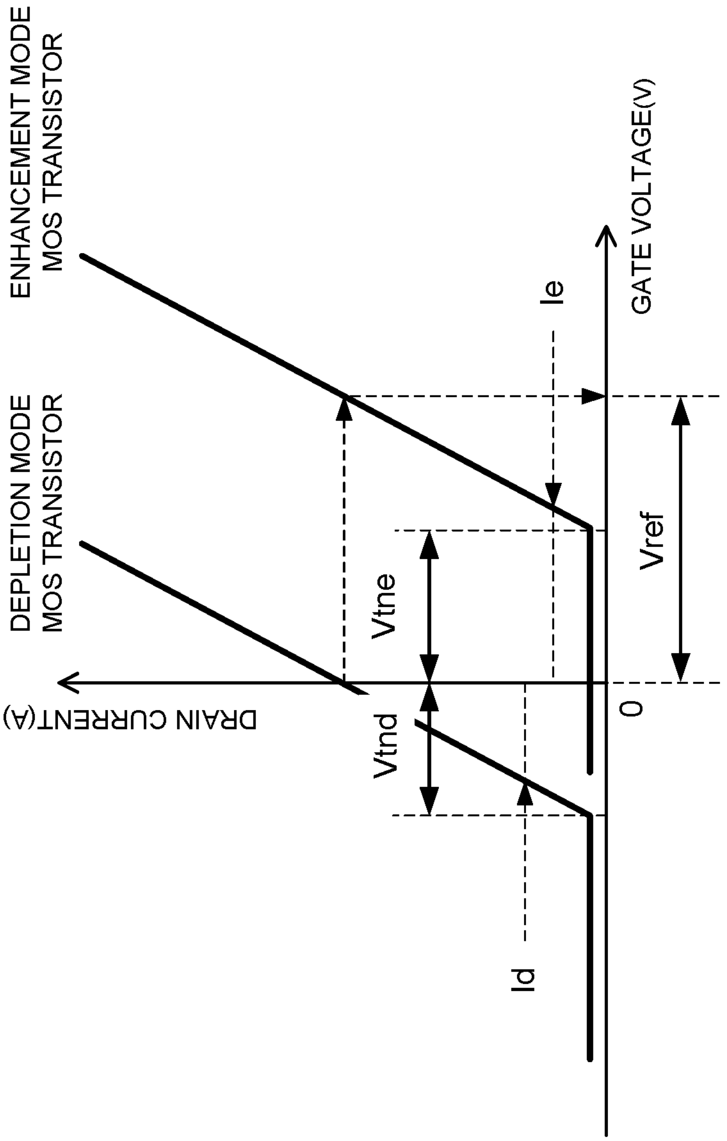
FIG. 2 is an explanatory diagram for illustrating operation of a reference voltage source built from paired transistors in the at least one embodiment.

FIG. 2 is an explanatory diagram for illustrating operation of the reference voltage source built from the paired transistors in the at least one embodiment.

As illustrated in FIG. 2, a combined resistance value of the voltage dividing circuit 150 is adjusted in advance so that a current Id which is approximately the same as a current Ie (the output current Iout) flowing in the enhancement mode MOS transistor 130 flows in the depletion mode MOS transistor 140. With the gate terminals of the paired transistors connected to each other and the source terminal 130S of the enhancement mode MOS transistor 130 grounded, the paired transistors are capable of generating the reference voltage Vref at the source terminal 140S of the depletion mode MOS transistor 140.

The enhancement mode MOS transistor 130 is the same as the depletion mode MOS transistor 140 in conductivity type and impurity concentration of a channel, and is different from the depletion mode MOS transistor 140 in Fermi level of a gate electrode. In other words, the enhancement mode MOS transistor 130 can be formed by the same process as a process used for the depletion mode MOS transistor 140, except for a part in which the Fermi level of the gate electrode differs.

This enables canceling out of manufacturing variation in the channels of the enhancement mode MOS transistor 130 and the depletion mode MOS transistor 140, and generation of the reference voltage Vref with high precision. Consequently, fluctuations of the divided voltage Vdiv can be reduced, thus enabling the reference current circuit 100 to supply the reference current Iref with high precision.

Specifically, structures of the enhancement mode MOS transistor 130 and the depletion mode MOS transistor 140 are described with reference to FIG. 3A, FIG. 3B, and FIG. 4.

Figure 3A:
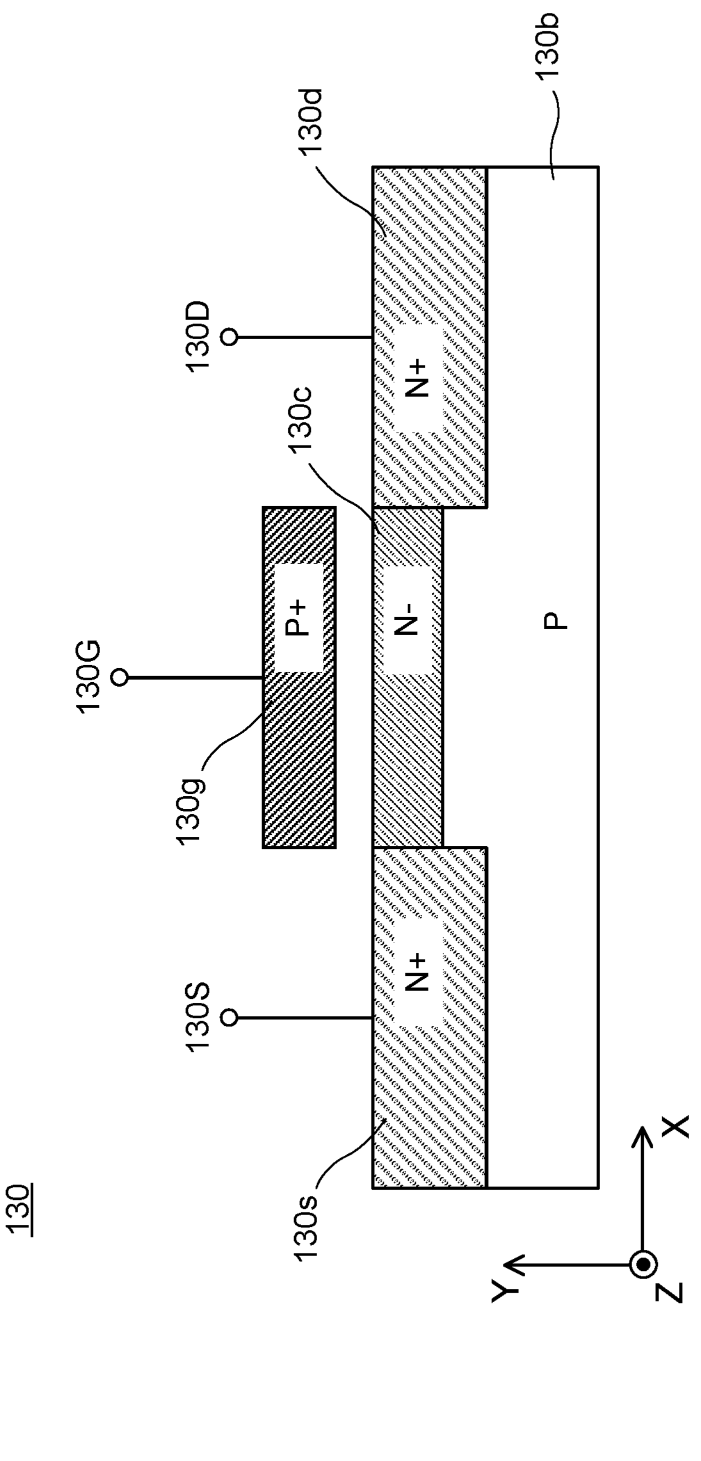
FIG. 3A is a schematic sectional view for illustrating an enhancement mode MOS transistor illustrated in FIG. 1.

FIG. 3A is a schematic sectional view for illustrating the enhancement mode MOS transistor illustrated in FIG. 1.

As illustrated in FIG. 3A, the enhancement mode MOS transistor 130 includes a gate electrode 130*g*, a drain region 130*d*, and a source region 130*s* connected to the gate terminal 130G, the drain terminal 130D, and the source terminal 130S, respectively, which are terminals illustrated in FIG. 1.

Figure 4:
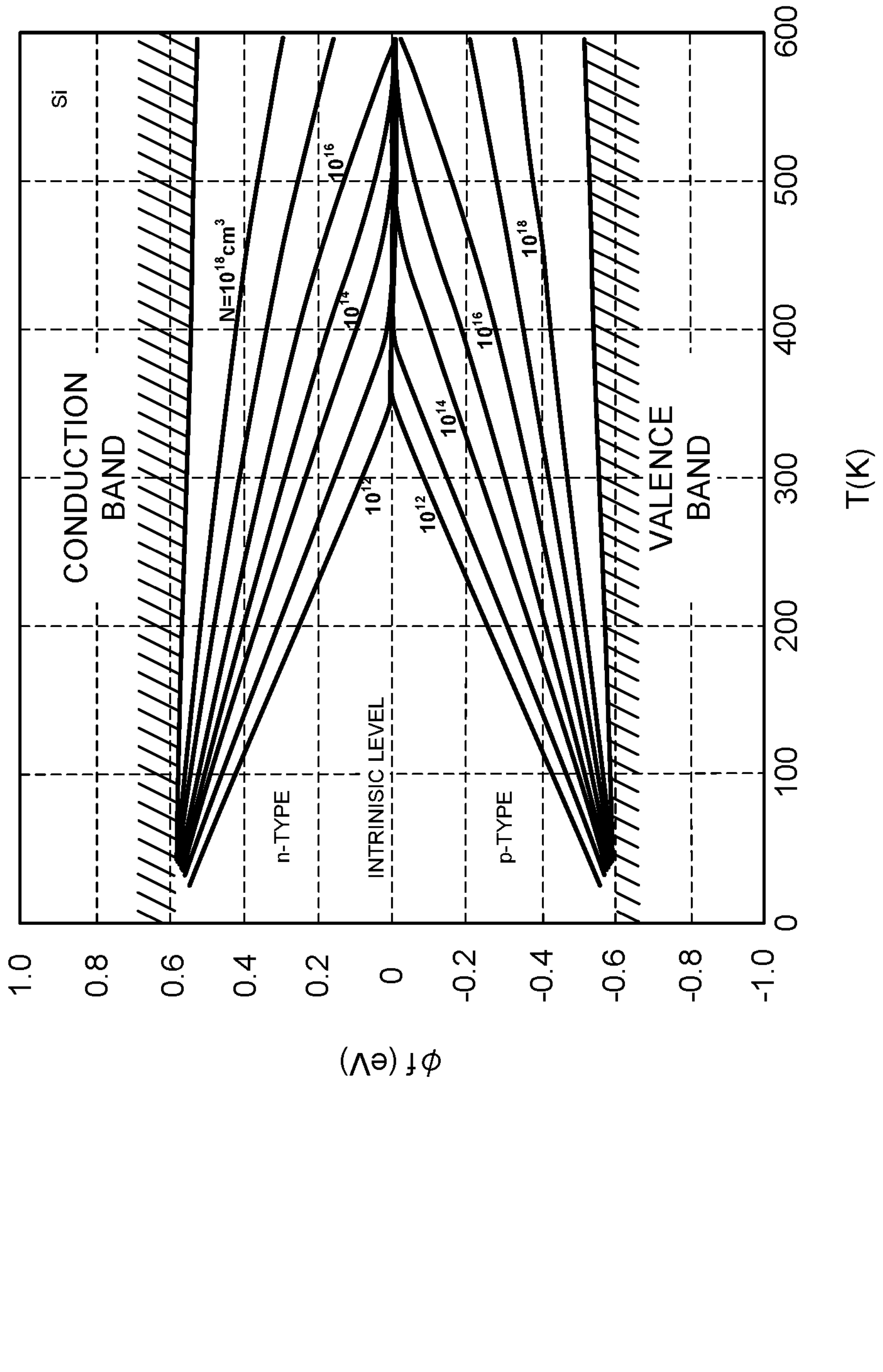
FIG. 4 is a band graph for showing dependency of a Fermi level in silicon on temperature and on impurity concentration.

The gate electrode 130*g* has a $P^+$ conductivity type as a result of being heavily doped with boron, and has a Fermi level close to a valence band in a band graph of FIG. 4. A channel 130*c* located below the gate electrode 130*g* has an $N^-$ conductivity type, and is formed by lightly doping a surface of a P-type silicon substrate 130*b* with phosphorus. A Fermi level of the channel 130*c* is raised toward the valence band because the Fermi level of the gate electrode 130*g* is close to the valence band, and is consequently depleted.

For that reason, at 0 V of gate-source potential difference, for example, no current path is formed in the $N^-$-type channel 130*c* even between the $N^+$-type drain region 130*d* and the $N^+$-type source region 130*s* which are of the same conductivity type. In this regard, the enhancement mode MOS transistor 130 differs from general enhancement mode MOS transistors having a channel undoped with impurities.

Figure 3B:
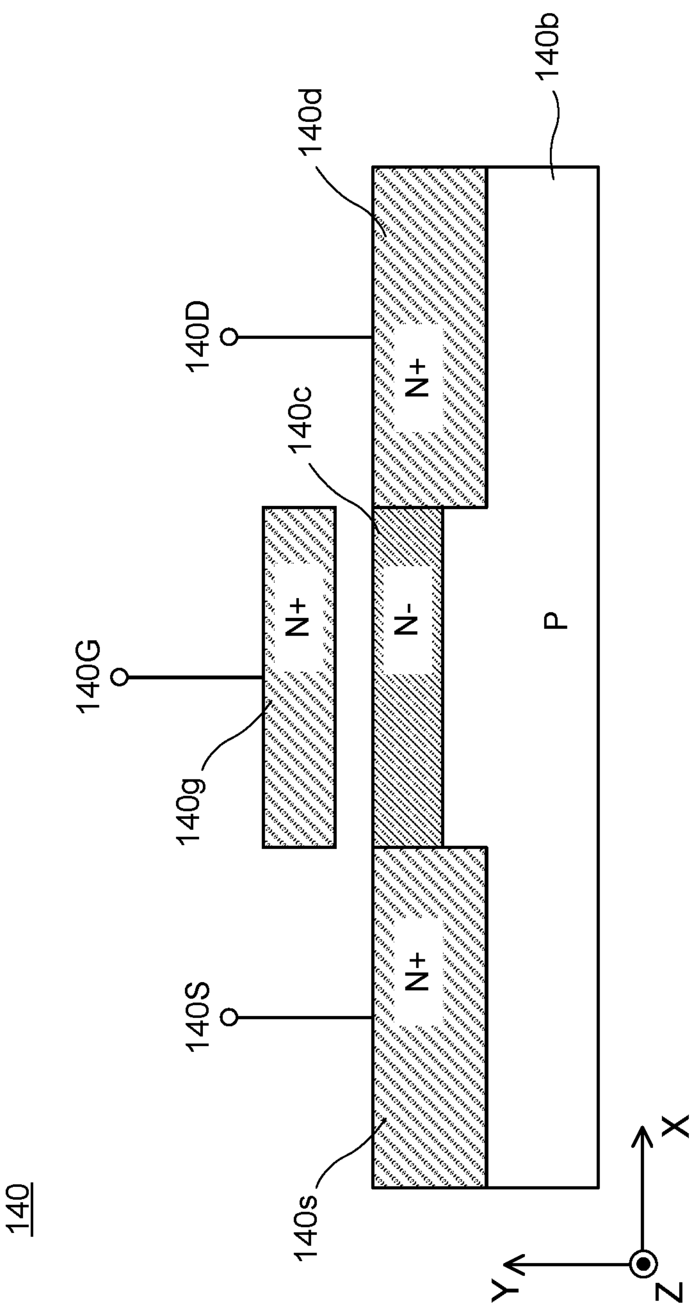
FIG. 3B is a schematic sectional view for illustrating a first depletion mode MOS transistor illustrated in FIG. 1.

FIG. 3B is a schematic sectional view for illustrating the first depletion mode MOS transistor illustrated in FIG. 1.

As illustrated in FIG. 3B, the depletion mode MOS transistor 140 includes a gate electrode 140*g*, a drain region 140*d*, and a source region 140*s* connected to the gate terminal 140G, the drain terminal 140D, and the source terminal 140S, respectively, which are terminals illustrated in FIG. 1.

The gate electrode 140*g* has an $N^+$ conductivity type as a result of being heavily doped with phosphorus, and has a Fermi level close to the conduction band in the band graph of FIG. 4. A channel 140*c* located below the gate electrode 140*g* has the $N^-$ conductivity type, and is formed by lightly doping a surface of a P-type silicon substrate 140*b* with phosphorus, with use of the same process as the process used to form the channel 130*c* of the enhancement mode MOS transistor 130.

For that reason, even at 0 V of gate-source potential difference, for example, a current path is formed in the $N^-$-type channel 140*c* between the $N^+$-type drain region 140*d* and the $N^+$-type source region 140*s* which are of the same conductivity type.

With the channel 130*c* thus having the same conductivity coefficient and the same temperature coefficient of the conductivity coefficient as those of the channel 140*c*, factors of variation due to the conductivity types and the impurity concentrations of the channel 130*c* and the channel 140*c* can be suppressed. Thus, the paired transistors that are the enhancement mode MOS transistor 130 and the depletion mode MOS transistor 140 enable generation of the reference voltage Vref with high precision. Consequently, fluctuations of the divided voltage Vdiv can be reduced, thus enabling the reference current circuit 100 to supply the reference current Iref with high precision.

To accomplish low current consumption in a semiconductor chip, a current flowing in each element is required to be reduced.

For example, in a case of the reference voltage source as described in Japanese Patent Application Laid-open No. 2001-284464, a reduction in current of a depletion mode MOS transistor having a source and a gate connected to each other requires lengthening of a channel length. In addition, in order to generate a highly precise reference voltage with manufacturing variation decreased, an enhancement mode MOS transistor paired with the depletion mode MOS transistor is required to have a long channel length as well. This reference voltage source thus requires equal lengthening of each channel length, and consequently ends up with a large layout area.

In this regard, in the reference voltage source of the at least one embodiment, the current flowing in the enhancement mode MOS transistor 130 is limited by the output current Iout and the current flowing in the depletion mode MOS transistor 140 is limited by the combined resistance of the voltage dividing circuit 150. This enables the enhancement mode MOS transistor 130 and the depletion mode MOS transistor 140 to have a minimum channel length allowed by the process, and the channel length of each of the enhancement mode MOS transistor 130 and the depletion mode MOS transistor 140 can be made shorter than at least a channel length of the depletion mode MOS transistor 160.

Because the paired transistors of the reference voltage source can each have a short channel length in this manner, the reference current circuit 100 can be reduced in layout area.

From the view point of reducing current consumption, the current flowing in the depletion mode MOS transistor 140 is preferred to be larger than a current flowing when a gate voltage of the depletion mode MOS transistor 140 is at the threshold voltage, and smaller than a current flowing when the gate voltage of the depletion mode MOS transistor 140 has the same potential as a potential of a source voltage. The current flowing in the enhancement mode MOS transistor 130 is preferred to be approximately the same as the small current flowing in the depletion mode MOS transistor 140.

The current flowing in the depletion mode MOS transistor 140 is adjustable by the combined resistance of the voltage dividing circuit 150. The current flowing in the enhancement mode MOS transistor 130 is adjustable by the output current Iout from the current mirror circuit 110 through, for example, a change of a ratio of the current mirror circuit 110 or adjustment of the input current Iin.

—Temperature Characteristics of Reference Voltage Source—

Figure 5:
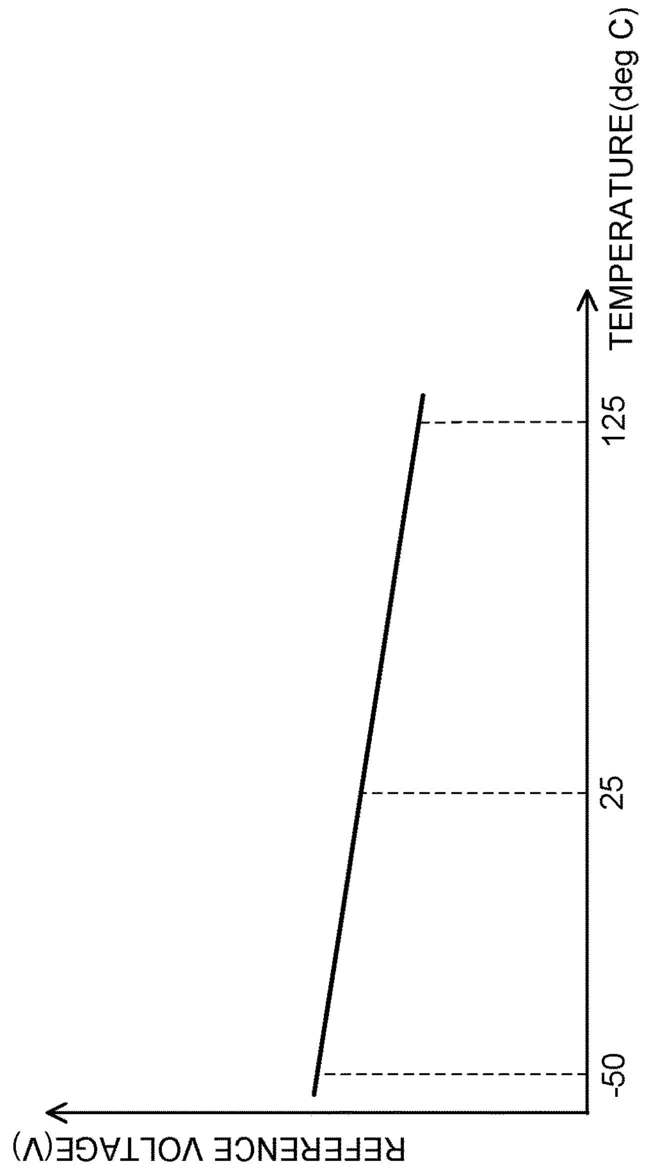
FIG. 5 is a graph for showing temperature characteristics of a reference voltage generated by the reference voltage source in the at least one embodiment.

FIG. 5 is a graph for showing temperature characteristics of the reference voltage generated by the reference voltage source in the at least one embodiment.

As shown in FIG. 5, the reference voltage Vref has such temperature characteristics that the reference voltage Vref drops in response to a rise in ambient temperature. This is because, as shown in the band graph of FIG. 4, in the depletion mode MOS transistor 140, a rise in ambient temperature causes a drop in the Fermi level of the gate electrode 140*g*, resulting in a rise of the threshold voltage Vtnd (a plus direction) and a decrease in an absolute value |Vtnd| of the threshold voltage. In the enhancement mode MOS transistor 130, a rise in ambient temperature causes a rise in the Fermi level of the gate electrode 130*g*, resulting in a drop in threshold voltage Vtne (a minus direction). Approximate matching of the current flowing in the depletion mode MOS transistor 140 to the current flowing in the enhancement mode MOS transistor 130 brings the reference voltage Vref close to a value of an expression "Vref=|Vtnd|+Vtne," and gives the reference voltage Vref temperature characteristics that cause the reference voltage Vref to drop in response to a rise in ambient temperature.

The reference voltage Vref thus has temperature characteristics that cause the reference voltage Vref to drop in response to a rise in ambient temperature. The reference voltage Vref is divided by the voltage dividing circuit 150 into the divided voltage Vdiv, and the divided voltage Vdiv is applied to the gate terminal of the depletion mode MOS transistor 160 (see FIG. 1). That is, the divided voltage Vdiv has temperature characteristics that cause, similarly to the temperature characteristics of the reference voltage Vref, the divided voltage Vdiv to drop in response to a rise in ambient temperature.

Next, description is given on stabilization of the reference current Iref against changes in ambient temperature by canceling out the temperature characteristics of the divided voltage Vdiv through utilization of temperature characteristics of the depletion mode MOS transistor 160

—Temperature Characteristics of Depletion Mode MOS Transistor—

Figure 6:
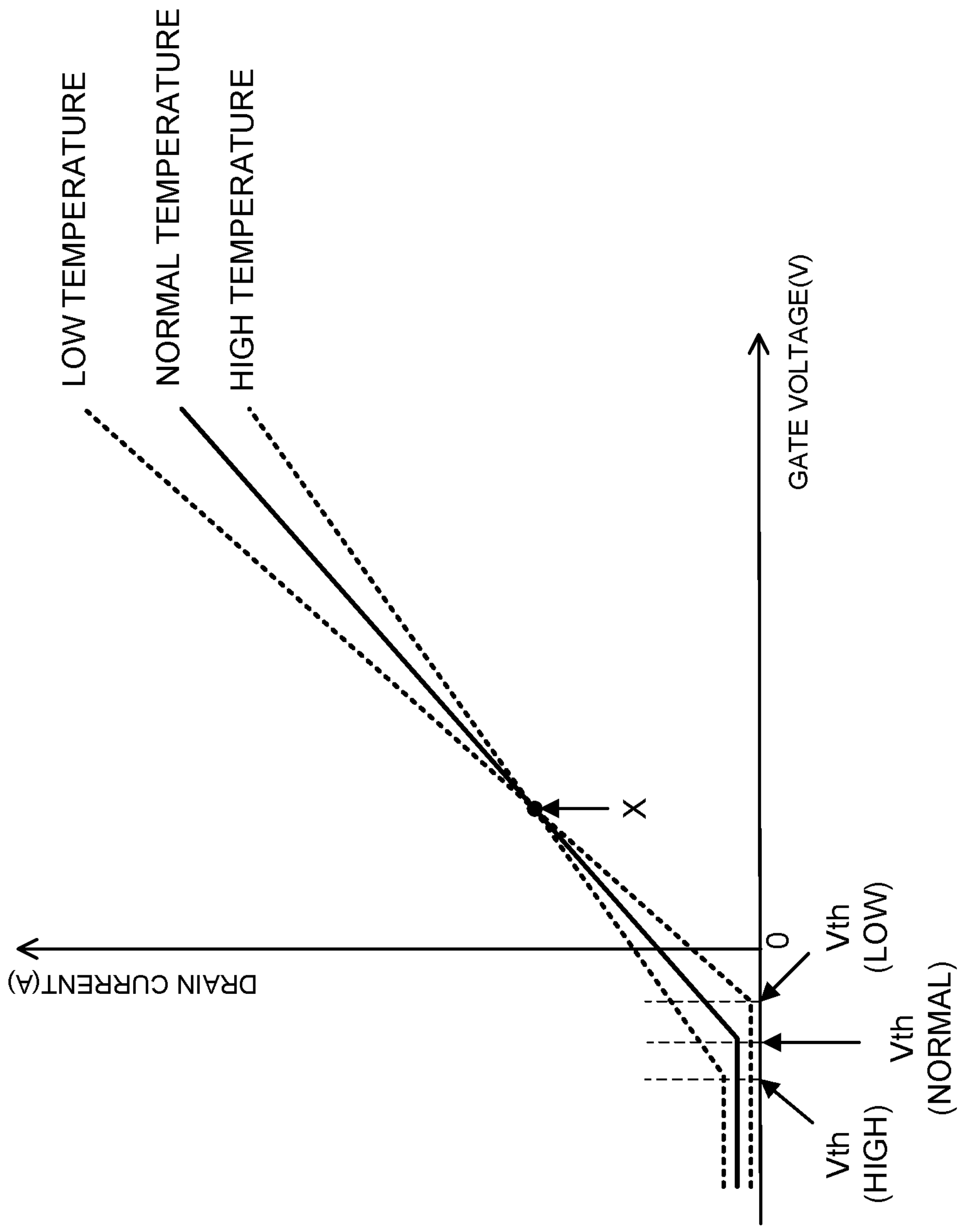
FIG. 6 is a graph for showing gate voltage-drain current characteristics of a depletion mode MOS transistor used as a constant current source in the at least one embodiment.

FIG. 6 is a graph for showing gate voltage-drain current characteristics of the depletion mode MOS transistor used as a constant current source in the at least one embodiment.

As shown in FIG. 6, the depletion mode MOS transistor 160 is similar to general MOS transistors in that no drain current flows at a gate voltage equal to or lower than a threshold voltage Vth and in that a drain current having a slope based on the conductivity coefficient flows at a gate voltage higher than the threshold voltage Vth. A rise in ambient temperature causes the threshold voltage Vth and the conductivity coefficient to drop, and consequently decreases the slope of the gate voltage-drain current characteristics. Accordingly, there is a cross point X at which the gate voltage-drain current characteristics exhibit no temperature characteristics.

Application of a gate voltage equal to or lower than the cross point X leads to an increase in drain current in response to a rise in ambient temperature, and application of a gate voltage higher than the cross point X leads to a decrease in drain current in response to a rise in ambient temperature.

The at least one embodiment deals with the drop in divided voltage Vdiv in response to a rise in ambient temperature by applying a gate voltage higher than the threshold voltage and lower than the cross point X (that is, the divided voltage Vdiv) in the depletion mode MOS transistor 160.

This enables the depletion mode MOS transistor 160 to supply the current mirror circuit 110 with the input current Iin stable regardless of changes in ambient temperature.

Figure 7:
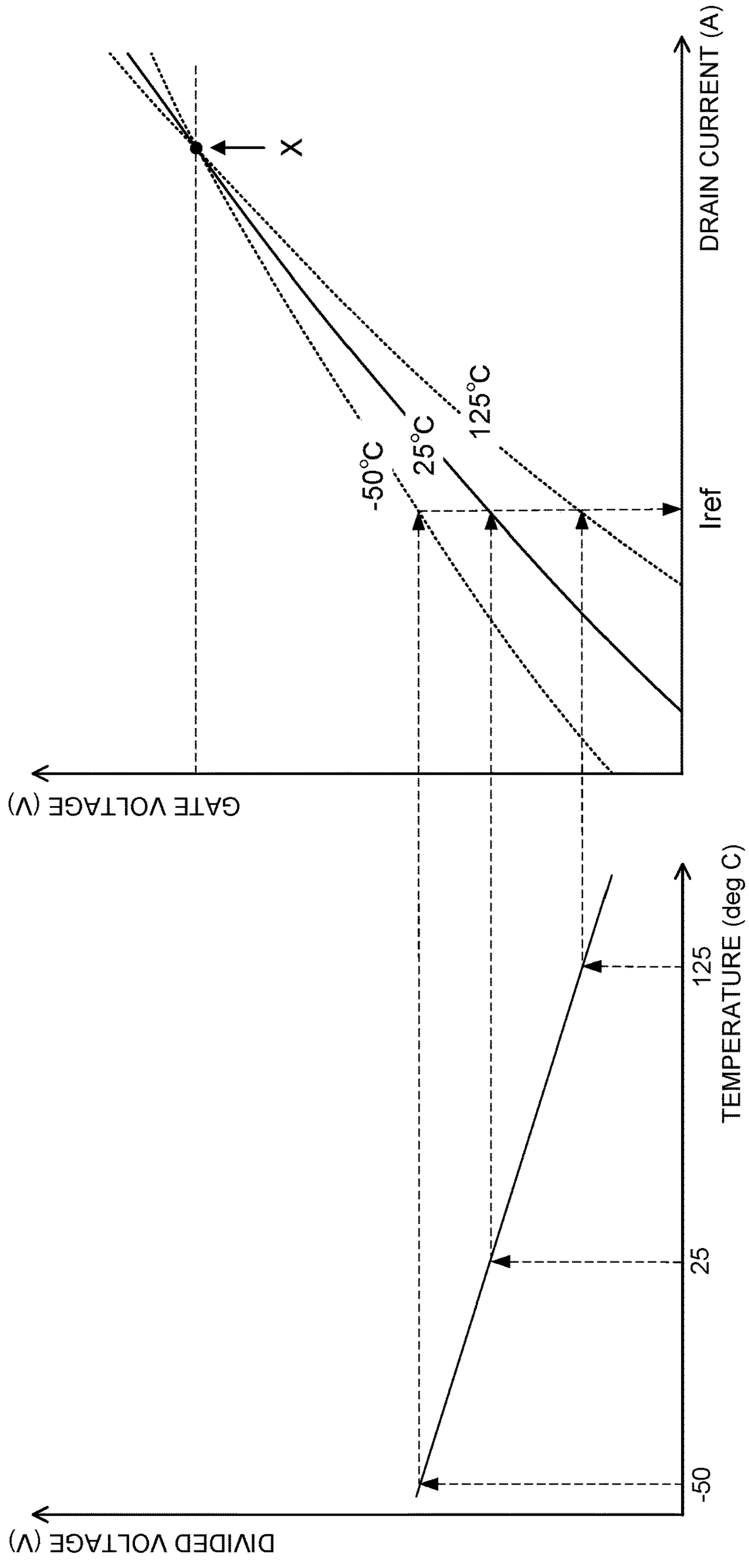
FIG. 7 is an explanatory diagram for illustrating temperature characteristics of an input current supplied by the depletion mode MOS transistor in the at least one embodiment.

FIG. 7 is an explanatory diagram for illustrating temperature characteristics of the input current supplied by the depletion mode MOS transistor in the at least one embodiment. FIG. 7 includes, on the left-hand side, a graph for showing temperature characteristics of the divided voltage Vdiv created in the voltage dividing circuit 150 by voltage division of the reference voltage Vref shown in FIG. 5. On the right-hand side, there is included a graph for showing an enlarged view of a part of temperature characteristics of the depletion mode MOS transistor 160 around the cross point X, with the axis of ordinate and the axis of abscissa of the gate voltage-drain current characteristics shown in FIG. 6 switched. In FIG. 7, there is shown a relationship between the temperature characteristics of the divided voltage Vdiv from the voltage dividing circuit 150 and temperature characteristics exhibited by the input current Iin upon application of the divided voltage Vdiv to the gate terminal of the depletion mode MOS transistor 160.

As illustrated in FIG. 7, the reference current circuit 100 is set so that a gate voltage lower than the cross point X shown in FIG. 6 (the divided voltage Vdiv) is applied to the gate terminal of the depletion mode MOS transistor 160 by adjusting the voltage division ratio of the voltage dividing circuit 150.

This ensures that, in response to a drop in divided voltage Vdiv caused by a rise in ambient temperature, the drain current increases that much owing to the temperature characteristics of the depletion mode MOS transistor 160 and, as a result, the input current Iin is stabilized against changes in ambient temperature. In addition, the adjustability of the divided voltage Vdiv by setting of the voltage division ratio means that an impurity implantation step for deeper adjustment of the threshold voltage of the depletion mode MOS transistor 160 is unrequired.

Accordingly, the reference current circuit 100 can supply, via the current mirror circuit 110 which receives the input current Iin, the reference current Iref stable regardless of changes in ambient temperature.

The reference current circuit 100 can thus supply, with high precision, the reference current Iref stable regardless of changes in ambient temperature because the drain current of the depletion mode MOS transistor 160 increases despite a drop in divided voltage Vdiv caused by a rise in ambient temperature. Further, in the reference current circuit 100, the depletion mode MOS transistor 140 is a source follower and functions as a buffer, thus eliminating a need for a buffer built from a differential amplifier which requires a large layout area. The layout area can be reduced as a result.

Moreover, because the paired transistors of the reference voltage source can each have a short channel length, the reference current circuit 100 can be further reduced in layout area.

—Modification Example—

The voltage dividing circuit 150 may include a trimming circuit capable of adjusting the divided voltage Vdiv so as to facilitate tuning of the divided voltage Vdiv.

Figure 8:
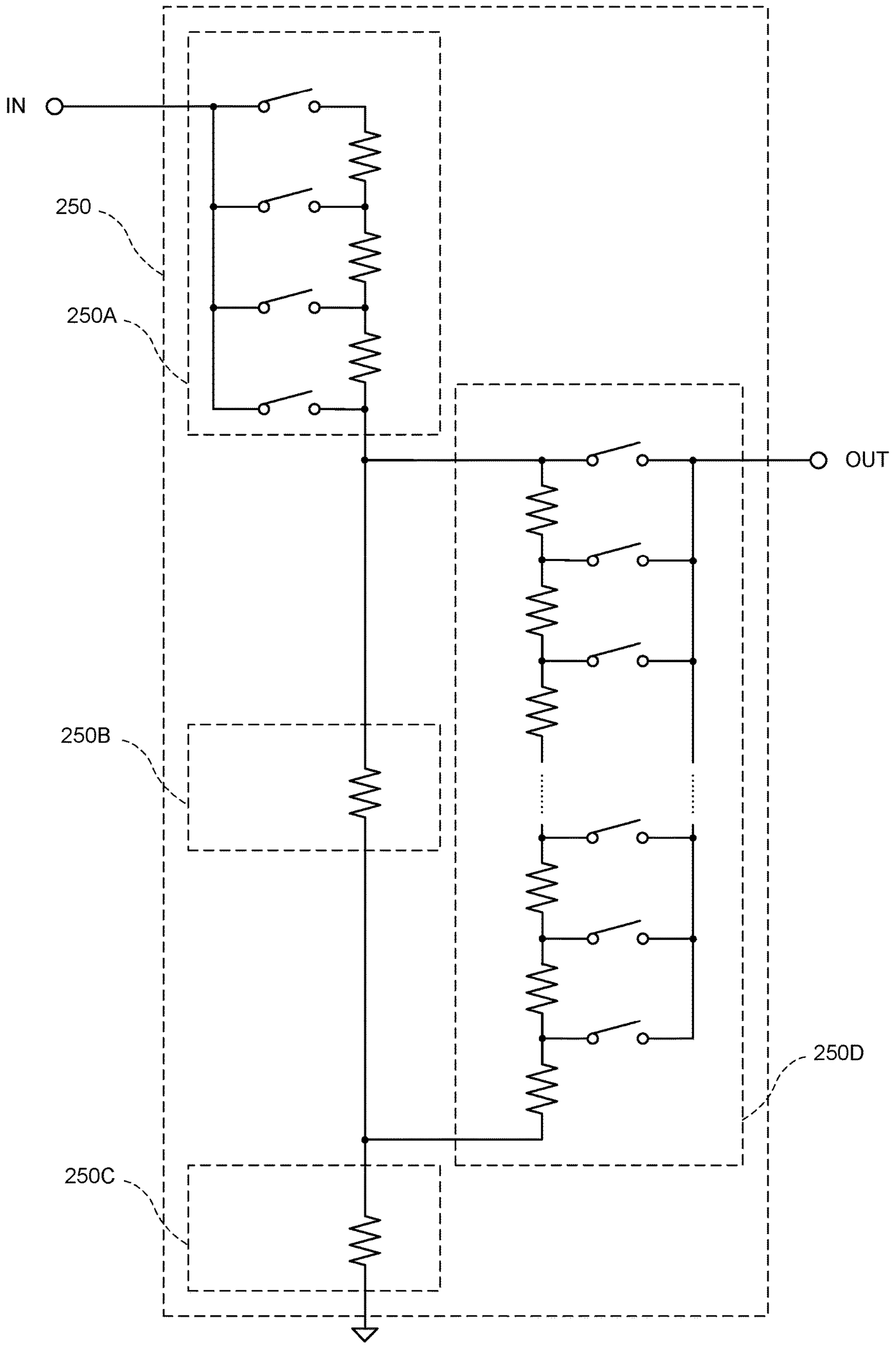
FIG. 8 is a circuit diagram for illustrating a modification example of a voltage dividing circuit illustrated in FIG. 1.

Specifically, as illustrated in FIG. 8, a voltage dividing circuit 250 includes a first resistance unit 250A, a second resistance unit 250B, a third resistance unit 250C, and a fourth resistance unit 250D. The first resistance unit 250A, the second resistance unit 250B, and the third resistance unit 250C are connected in series. The fourth resistance unit 250D is connected in parallel to the third resistance unit 250C.

The first resistance unit 250A includes a plurality of resistive elements connected in series and switching elements connected to respective nodes of the plurality of resistive elements. The first resistance unit 250A executes rough adjustment of the divided voltage Vdiv by selectively turning on the switching elements.

The fourth resistance unit 250D includes a plurality of resistive elements connected in series and switching elements connected to respective nodes of the plurality of resistive elements. The fourth resistance unit 250D uses the plurality of resistive elements to divide a potential difference in the fourth resistance unit 250D into minute steps, executes fine adjustment of the divided voltage Vdiv by selectively turning on the switching elements, and sends the finely adjusted divided voltage Vdiv out of an OUT terminal.

Inclusion of the trimming circuit thus enables the voltage dividing circuit 250 to finely adjust the divided voltage Vdiv and, accordingly, the reference current Iref stable regardless of changes in ambient temperature can be supplied with high precision.

As described above, the reference current circuit according to the at least one embodiment of the present invention includes: a current mirror circuit formed from a MOS transistor pair which is a pair of MOS transistors having gate terminals connected to each other, the current mirror circuit being configured to supply an output current based on an input current; and an output MOS transistor configured to supply a reference current based on a voltage of the gate terminals of the MOS transistor pair.

This reference current circuit also includes paired transistors that are an enhancement mode MOS transistor and a first depletion mode MOS transistor, and functions as a reference voltage source. The enhancement mode MOS transistor includes a drain terminal to which the output current is to be supplied from the current mirror circuit, a gate terminal connected to the drain terminal, and a source terminal that is grounded. The enhancement mode MOS transistor is the same as the first depletion mode MOS transistor in conductivity type and impurity concentration of a channel, and is different from the first depletion mode MOS transistor in Fermi level of a gate electrode. The first depletion mode MOS transistor includes a gate terminal connected to the gate terminal of the enhancement mode MOS transistor, and is configured to generate a reference voltage based on a difference between a voltage of the source terminal of the enhancement mode MOS transistor and a voltage of a source terminal of the first depletion mode MOS transistor.

This reference current circuit further includes: a voltage dividing circuit connected to the source terminal of the first depletion mode MOS transistor, the voltage dividing circuit being configured to supply a divided voltage of the reference voltage; and a second depletion mode MOS transistor configured to supply, as the input current, a current based on the divided voltage to the current mirror circuit.

The voltage dividing circuit is configured to supply a gate terminal of the second depletion mode MOS transistor with the divided voltage within a voltage range higher than a threshold voltage of the second depletion mode MOS transistor and lower than a cross point at which gate voltage-drain current characteristics of the second depletion mode MOS transistor are independent of temperature.

With this configuration, this reference current circuit is capable of supplying, with high precision, the reference current Iref stable regardless of changes in ambient temperature, and enables a reduction in layout area as well.

What is claimed is:

1. A reference current circuit, comprising:

a current mirror circuit formed from a MOS transistor pair which is a pair of MOS transistors having gate terminals connected to each other, the current mirror circuit being configured to supply an output current based on an input current that is received by one of the MOS transistors from another of the MOS transistors;

an output MOS transistor configured to supply a reference current based on a voltage of the gate terminals of the MOS transistor pair;

an enhancement mode MOS transistor including a drain terminal to which the output current is to be supplied from the current mirror circuit, a gate terminal connected to the drain terminal, and a source terminal that is grounded;

a first depletion mode MOS transistor including a gate terminal connected to the gate terminal of the enhancement mode MOS transistor, the first depletion mode MOS transistor being configured to generate a reference voltage based on a difference between a voltage of the source terminal of the enhancement mode MOS transistor and a voltage of a source terminal of the first depletion mode MOS transistor;

a voltage dividing circuit connected to the source terminal of the first depletion mode MOS transistor, the voltage dividing circuit being configured to supply a divided voltage of the reference voltage; and a second depletion mode MOS transistor configured to supply, as the input current, a current based on the divided voltage to the current mirror circuit, the enhancement mode MOS transistor being the same as the first depletion mode MOS transistor in conductivity type and impurity concentration of a channel, and being different from the first depletion mode MOS transistor in Fermi level of a gate electrode, the voltage dividing circuit being configured to supply a gate terminal of the second depletion mode MOS transistor with the divided voltage within a voltage range higher than a threshold voltage of the second depletion mode MOS transistor and lower than a cross point at which gate voltage-drain current characteristics of the second depletion mode MOS transistor are independent of temperature.

2. The reference current circuit according to claim 1, wherein the enhancement mode MOS transistor and the first depletion mode MOS transistor each have a channel length shorter than a channel length of the second depletion mode MOS transistor.

3. The reference current circuit according to claim 2, wherein, in the first depletion mode MOS transistor, a current flows within a voltage range higher than a threshold voltage and lower than 0 V, and wherein, in the enhancement mode MOS transistor, approximately the same current as the current flowing in the first depletion mode MOS transistor flows.

4. The reference current circuit according to claim 1, wherein the voltage dividing circuit includes a trimming circuit configured to adjust the divided voltage.

* * * * *